United States Patent

Moreno et al.

[11] 3,904,983
[45] Sept. 9, 1975

[54] PARASITIC MODE SUPPRESSOR FOR HIGH POWER LASERS

[75] Inventors: Frederick E. Moreno, Los Altos; Russell F. Kirk, Sunnyvale; Jack D. Foster, Los Altos, all of Calif.

[73] Assignee: GTE Sylvania Incorporated, Mountain View, Calif.

[22] Filed: Apr. 16, 1973

[21] Appl. No.: 351,800

[52] U.S. Cl.......................... 331/94.5 C; 331/94.5 G
[51] Int. Cl.².......................... H01S 3/08; H01S 3/22
[58] Field of Search..................... 331/94.5; 330/4.3

[56] References Cited
UNITED STATES PATENTS
3,757,251  9/1973  Buczek et al. .................. 331/94.5

Primary Examiner—Robert J. Webster
Attorney, Agent, or Firm—John F. Lawler; Norman J. O'Malley; Elmer J. Nealon

[57] ABSTRACT

Parasitic modes in a high power folded cavity gas transport laser are suppressed by reflective apertured plates mounted between the folding mirrors and the active or lasing region and inclined with respect to each other and the reflecting planes of the mirrors. The principal laser beam traverses the lasing region several times by successive reflections from the folding mirrors on opposite sides. The areas of each mirror available for reflecting the beam are limited to the portions of the mirror behind several plate apertures. Parasitic modes generated by the laser strike either or both of the inclined plates and are reflected out of and away from the laser cavity and are thus suppressed.

4 Claims, 4 Drawing Figures

PARASITIC MODE SUPPRESSOR FOR HIGH POWER LASERS

BACKGROUND OF THE INVENTION

This invention relates to lasers and more particularly to high power flowing gas (> 500 watts) folded cavity lasers.

In a high power gas transport laser capable of producing outputs of 500–1,000 watts or greater, the optical cavity is frequently folded into a configuration providing multiple passes of the beam through the electrically excited lasing region in order to utilize this space more efficiently and thus practicably limit the size of the laser system. Such a folded cavity configuration uses folding mirrors on opposite sides of the lasing region for redirecting the beam several times through it. Such a configuration is utilized in the gas transport laser described in application Ser. No. 290,545 of J. D. Foster et al., now U.S. Pat. No. 3,772,610 assigned to the assignee of this invention.

During normal operation of the laser, power circulates around the folded cavity and a portion of this power is extracted through the partially transmitting mirror at the output end of the cavity. In practice, however, other modes begin to oscillate within the lasing region and these modes undesirably extract energy from the primary mode. Furthermore, for very high gain systems of this type, the additional parasitic modes use internal structures other than the mirrors to complete the optical circuit and in the process frequently heat these other parts causing distortion or thermal damage. For these reasons it is desirable to eliminate parasitic modes in the operation of the laser.

OBJECTS AND SUMMARY OF THE INVENTION

A general object of this invention is the provision of an effective parasitic mode suppressor for high power lasers.

A further object is the provision of such a suppressor which does not adversely affect the normal operation of the laser.

Another object is the provision of a simple, low-cost mode suppressor that is readily installed in the laser cavity.

In accordance with this invention, the reflecting surface of each folding mirror is partially masked by an apertured inclined reflecting plate which limits exposure of the mirror only to the main laser beam and which reflects parasitic modes completely out of the lasing region to suppress them.

DESCRIPTION OF PREFERRED EMBODIMENT

Figure 1:
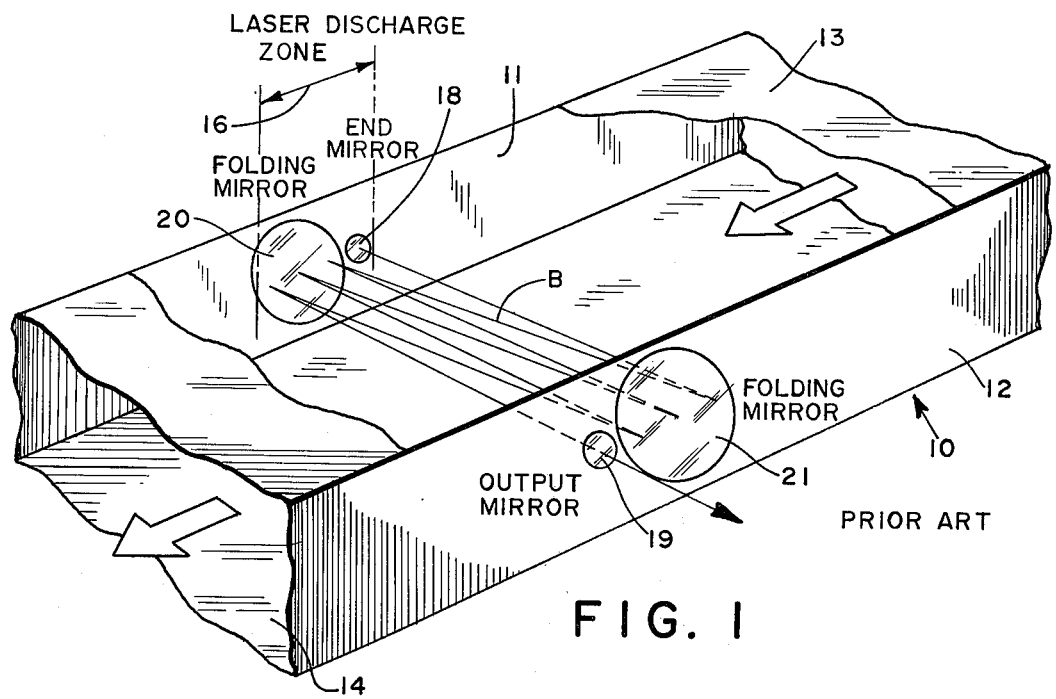
FIG. 1 is a perspective schematic view of the cavity of a prior art gas transport laser having folding mirrors and illustrating the several reflections of the main laser beam through the laser discharge zone.

Referring now to the drawings, one type of laser with which the invention may be practiced is a gas transport laser described in the foregoing application Ser. No. 290,545, a part of which is shown schematically in FIG. 1, comprising a rectangular gas flow channel or duct 10 having side walls 11 and 12, a top wall 13 and a bottom wall 14 through which a gas lasing medium such as a carbon dioxide-nitrogen-helium mixture flows in the direction of the arrows. Lasing action within the gas is produced by an electric discharge across duct 10 and between vertically spaced electrodes, not shown, so as to create a discharge zone 16 across substantially the full width of duct 10.

The optical cavity of the laser is defined by a fully reflecting end mirror 18 on one side of discharge zone, a partially transmitting output mirror 19 preferably on the other side and longitudinally displaced from mirror 18, and fully reflecting folding mirrors 20 and 21 on opposite sides of zone 16 and between the longitudinally spaced end and output mirrors 18 and 19, respectively. These several mirrors are optically aligned relative to each other so that the laser beam B is reflected several times through the discharge zone before a portion of the beam energy is coupled through mirror 19 as the useful coherent light output of the apparatus. By way of example, the laser beam in the embodiment shown in FIG. 1 traverses the discharge zone seven times.

Figure 2:
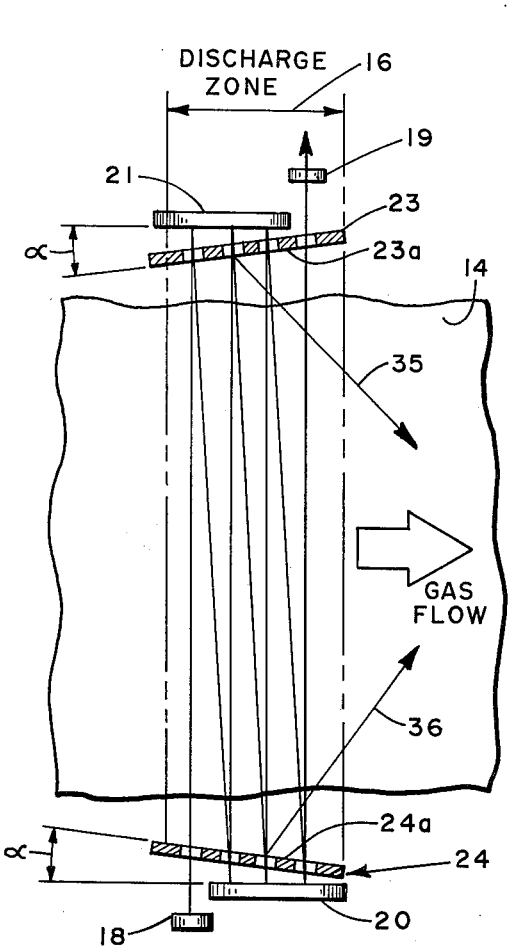
FIG. 2 is a schematic plan view of a gas transport laser embodying the invention showing the orientation of the mode suppressor plates with respect to the laser cavity.
Figure 3:
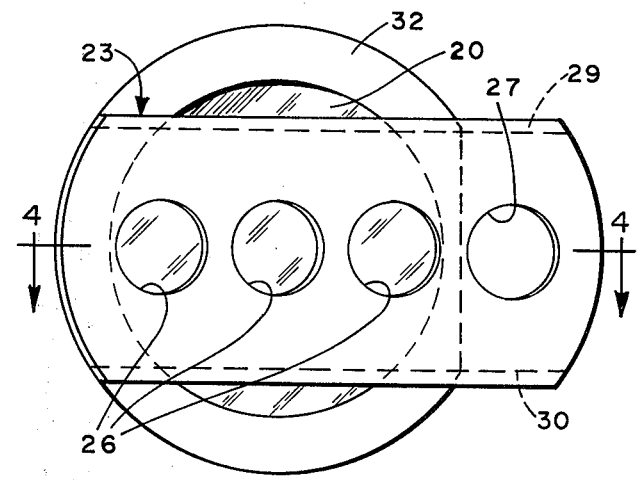
FIG. 3 is a front view of one of the mode suppressor plates embodying this invention disposed in front of the folding mirror.
Figure 4:
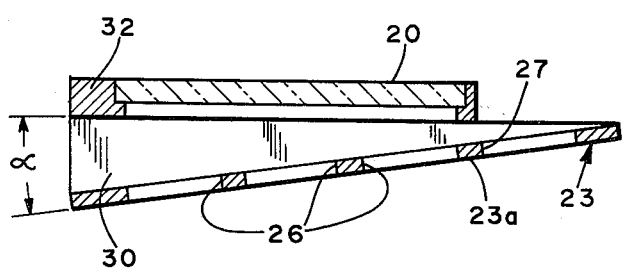
FIG. 4 is a transverse section taken on line 4—4 of FIG. 3.

In order to suppress all laser modes other than the principal beam B in accordance with this invention, suppressor plates 23 and 24, see FIGS. 2, 3 and 4, are supported adjacent to reflecting surfaces of folding mirrors 20 and 21, respectively, at an acute angle $\alpha$ relative to the reflecting surfaces of the mirrors. Suppressor plates 23 and 24 are substantially identical in construction, each having a plurality of preferably circular apertures 26 located in optical alignment with the points respectively on the surface of the adjacent folding mirror from which the primary beam B is reflected. In addition, each plate extends to the side of the associated folding mirror and has another aperture 27 designed to overlie either the end mirror 18 or output mirror 19 for access of laser beam B to these terminal mirrors.

Each of plates 23 has tapered side walls 29 and 30 adapted to be attached by screws or the like to a rigid frame 32 in which mirror 20 is mounted.

Plates 23 and 24 overlie substantial portions of the reflecting surfaces of folding mirrors 20 and 21, respectively, and have optically reflective surfaces 23a and 24a facing the discharge zone and disposed by reason of the tapered side walls 29 and 30 at the angle $\alpha$, preferably about 10°, with respect to the reflecting surfaces of the adjacent folding mirrors. Furthermore, each plate is so oriented that the incline angle diverges in the longitudinal direction of duct 10 so as to insure that undesired modes are reflected longitudinally out of the discharge zone. In addition, plates 23 and 24 are disposed at an angle with respect to each other preferably in the longitudinal direction so that surfaces 23a and 24a are not parallel and parasitic modes cannot be generated by reflection between the plates themselves. This is achieved simply by mounting the suppressor plates on the mirror frame with opposite tapers.

In operation, suppressor plates 23 and 24 permit primary beam B of the laser to be reflected between mirrors 18, 20, 21 and 19 without interference or obstruction as this beam passes successively through plate apertures 26 and 27 during successive passes through the discharge zone. Generation of undesired parasitic modes within the laser cavity are suppressed, however, by the reflection of these modes from the inclined inner surfaces of suppressor plates 23 and 24 in a direction longitudinally out of the laser discharge zone. This suppressor action is illustrated schematically in FIG. 2 by arrows 35 and 36 representing parasitic modes generated within the discharge zone and deflected by plates 23 and 24 out of (downstream of) that zone.

What is claimed is:

1. In a high power laser having an optical cavity defined in part by a pair of folding mirrors on opposite sides of the laser discharge zone, the improvement of a parasitic mode suppressor comprising an optical reflector disposed between one of the folding mirrors and the discharge zone within which parasitic oscillation modes are generated and having a reflecting surface inclined at an acute angle greater than zero-degrees with respect to the plane of reflection of said one folding mirror for reflecting said parasitic oscillation modes incident upon it out of said discharge zone, said reflector having a plurality of apertures aligned respectively with the portions of said one folding mirror from which the primary laser beam is successively reflected.

2. The high power laser according to claim 1 with another of said reflectors mounted between the other folding mirror and the discharge zone, said reflectors being angularly disposed with respect to each other.

3. In a high power gas transport laser having a duct through which a gaseous lasing medium moves, means for producing an electrical discharge zone through said gas in said duct, and an optical cavity comprising an end mirror and an output mirror and two intermediate folding mirrors on opposite sides of the discharge zone within which parasitic oscillation modes are generated, the improvement of means for suppressing said parasitic modes generated in said discharge zone comprising a reflecting plate disposed between each folding mirror and the discharge zone, each of said plates having a plurality of longitudinally spaced apertures aligned with those portions of the associated folding mirror from which the primary laser beam is normally reflected, the surface of said plate facing the discharge zone being optically reflective and longitudinally inclined relative to the reflecting plane of the mirror, the opposed surfaces of said reflecting plates being angularly related to each other for longitudinally reflecting said parasitic modes incident upon it out of said discharge zone.

4. The laser according to claim 3 in which said opposed surfaces of the reflecting plates diverge from each other in a direction longitudinal of said duct.

\* \* \* \* \*